Dec. 17, 1968  J. HODGSON ETAL  3,416,740
PROCESS AND APPARATUS FOR MILLING
Filed Aug. 3, 1965
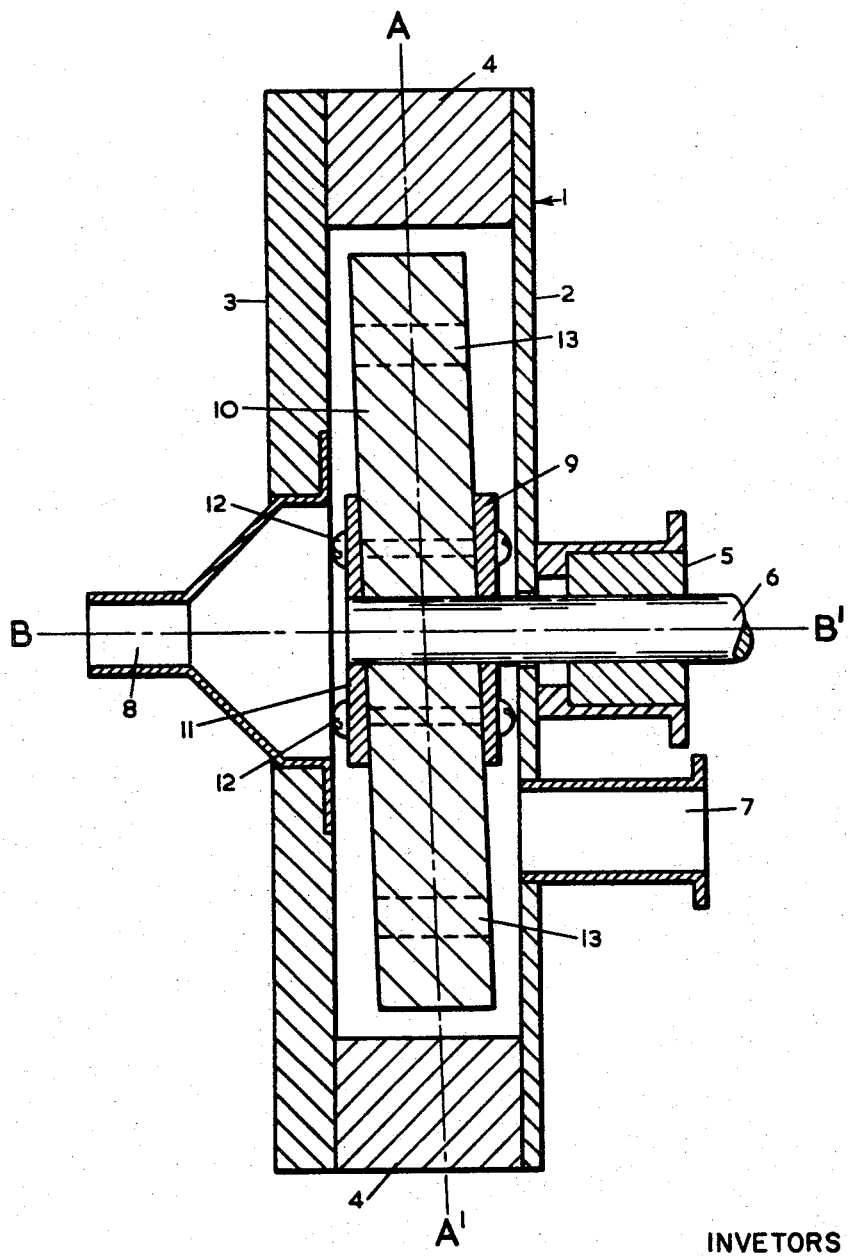
INVETORS
John Hodgson
Robert Oswald Hall
BY
*Irons, Birch, Swindler & McKie*
ATTORNEYS United States Patent Office 3,416,740
Patented Dec. 17, 1968

3,416,740
PROCESS AND APPARATUS FOR MILLING
John Hodgson, Chasm Creek, Burnie, Tasmania, and Robert Oswald Hall, Sulphur Creek, Burnie, Tasmania, Australia, assignors to British Titan Products Company Limited, Durham, England, a corporation of the United Kingdom
Filed Aug. 3, 1965, Ser. No. 476,898
Claims priority, application Great Britain, Aug. 22, 1964, 34,441/64
5 Claims. (Cl. 241—21)

ABSTRACT OF THE DISCLOSURE

A method for milling particulate solids, for example, titanium dioxide, in a fluid medium is described. An apparatus comprising a disc impeller mounted on a rotatable shaft and contained in a closed vessel provided with inlet and outlet means can be operated with greatly enhanced effectiveness if the disc impeller is mounted at a substantial angle relative to the shaft. Upon rotation of the shaft the impeller describes a "wobbling" motion which increases the efficiency of milling.

The present invention relates to an improved process for the milling of particulate solids in liquids. Since milling processes can also be used for the dispersion of particulate solids in liquids without appreciable reduction in the size of the particles, the term "milling" is used in this specification to include both the reduction in size of the solid particles and the dispersion of solid particles in liquids.

Previously used apparatus and processes for the milling of particulate solids in liquids have been described, for example in British specifications 679,552, 810,005, 900,050 and also in our U.S. Patent 3,185,398 and U.S. application 322,548, now Patent No. 3,307,792. The apparatus and processes described in these specifications generally comprise an open-ended vertical container into which projects a rotatable shaft carrying a number of circular impellers of larger diameter than the shaft.

The particulate solid to be milled, a liquid, and generally a milling medium such as particles of silica, glass ballotini, zircon, alumina or titanium dioxide, are placed in the container and the mixture is agitated by rotating the impellers immersed in the mixture at high speed.

Such processes have been found to suffer from several disadvantages. For example, the power consumption required to mill the particulate solid, for example titanium dioxide particles, is very high and the apparatus is therefore unnecessarily large and the process is excessively expensive to operate. Furthermore, the high power input and prolonged residence time in the container of the solid to be milled leads to heating of the contents of the container and it is difficult to remove this heat quickly, particularly when the apparatus is made from, or lined with, a material which has poor heat conducting properties, for example polyurethane rubber, as described and claimed in our British specification 900,050.

Another difficulty is experienced in such processes when a milling medium of small particle size is used, for example a zircon sand of particle size in the range of about 50 microns to 150 microns. When such a milling medium is used the grinding medium tends to be carried from the mill and the milling efficiency is decreased.

Again, abrasion of the container and/or impellers in the previously used processes has been troublesome owing to the large areas exposed to the milling action, particularly when the surfaces are not coated with, or made from, a material which resists abrasion such as polyurethane rubber. In the milling of pigments, for example titanium dioxide pigments, the abrasion of metal surfaces leads to contamination of the pigment with metal particles and to a consequent loss of brightness of the pigment.

It is an object of the present invention to provide a process and apparatus wherein some or all of the above disadvantages are reduced or eliminated.

Accordingly, the present invention is an apparatus for milling particulate solids in a liquid comprising a closed vessel having inlet and outlet orifices and into which projects an impeller shaft carrying a rotatable impeller of greater diameter than that of the shaft and wherein the plane of the impeller and the longitudinal axis of the impeller shaft from an angle other than a right angle.

The invention also comprises a process of introducing into the vessel of the apparatus described above through an inlet orifice a slurry of liquid and particulate solid and withdrawing from an outlet orifice a slurry of milled solid and liquid.

The closed vessel is preferably liquid tight with the exception of the orifices and is normally made of metal although it may be made from, or lined with, a material which is resistant to abrasion during milling, for example, polyurethane rubber, polyethylene or polypropylene.

The impeller shaft normally passes through a wall of the vessel by means of a gland which prevents leakage of liquid from the vessel at this point. The shaft may be rotated by any suitable means, for example, by an electric motor or the like.

The impeller, which is normally rigidly fixed to the shaft, and which rotates therewith is preferably, although not necessarily, a disc of suitable material, for example a disc made from, or coated with, a polymer such as polyurethane rubber, polypropylene or polyethylene, or metal providing the metal is one which does not undergo excessive abrasion and which does not excessively contaminate the material being milled with material having an adverse effect on the product. This is particularly important where pigments such as titanium dioxide are being milled since the properties of such pigments are very sensitive to some metal contaminants, for example iron and/or chromium.

It is preferred that the vessel shall contain only one impeller athough, if desired, it may contain more than one, for example 2 or 3.

The impeller should be rotated at a sufficiently high speed to provide the necessary milling of the particulate solid when the mill is in operation. The optimum speed at which the impeller is to be rotated may vary depending, inter alia, upon the nature of the solid to be milled and upon the conditions under which the mill is operating, for example in the presence or absence of a second particulate solid acting as a milling medium. In the milling of titanium dioxide, for example, in the presence of a milling medium such as Ottawa or zircon sand, peripheral speeds for the impeller in the range of about 10 to 120 ft./second have been found satisfactory, particularly speeds in the range 20 to 105 ft./second.

The optimum speed of rotation of the impeller under any particular conditions of operation can readily be determined by trial and error.

Similarly the distances between the surface of the impeller and the interior of the wall of the surrounding vessel should be such as to ensure adequate milling of the particulate solid and, again, the optimum value will depend to some extent on the particular conditions of operation. When milling titanium dioxide pigment in a vessel in the presence of a milling medium such as Ottawa or zircon sand a distance between the surface of the impeller and the interior wall of the vessel of 0.25 to 6 inches, particularly one in the range 0.25 to 3 inches and more particularly one in the range 0.25 to 1 inch, has been found to be very satisfactory.

The inlet and outlet orifices may be formed in the walls of the vessel in any convenient position, for example, one may be formed in the centre of the side wall opposite to that through which the impeller shaft passes and the other may be formed in the opposite wall (i.e. in the wall through which the impeller shaft passes) or in the peripheral wall (i.e. the wall of the vessel between that through which the impeller shaft passes and the opposite wall). Where the orifice is in the centre of a side wall this is preferably the outlet orifice and when in the peripheral wall, it is preferably the inlet orifice. It is also preferred, in the latter case, that the inlet orifice is so positioned that the incoming slurry of liquid and particulate solid to be milled (and milling medium if used) is directed initially in the direction of rotation of the impeller.

If desired, the surface of the impeller, particularly the periphery, and/or the interior wall of the vessel may be serrated in order to give enhanced milling of the particulate solid.

By the term "plane of the impeller" is meant an imaginary plane falling along the diameters of the impeller. The plane of the impeller is generally parallel to the faces of the impeller when the latter is in the form of a disc. The impeller may comprise a solid body, preferably in the form of (although not necessarily) a disc, and it has been found that very effective milling is obtained when the impeller is provided with holes between its opposite faces. Such holes are preferably formed at an angle to the faces, for example at an angle between 30° and 60°, particularly an angle of about 45°, and they may conveniently be formed equidistant from each other and from the centre of the impeller in order to provide a balanced impeller. Where the holes are formed at an angle it is preferred that the angle of the holes and the position of the exit orifice should be such that the slurry containing milled particulate solid tends to be directed toward the exit orifice by the rotation of the impeller.

A number of holes, for example at least 4 and preferably at least 6, have been found to give the most effective milling and a convenient size for such holes (when circular) has been found to be in the range of about ¼" to 1" diameter.

The effectiveness of the milling of particulate solids has been found to be greatly enhanced by the apparatus and processes of the present invention, i.e. by the provision of a mill of the type described above wherein the plane of the impeller and the longitudinal axis of the impeller shaft together form an angle other than a right angle. By this means the distance between the face of the impeller and the interior wall of the vessel at a given point varies during the rotation of the impeller thus causing an increase in turbulence within the vessel (when compared with a mill in which the angle between the plane of the impeller and axis of the impeller shaft is at 90°), and increased contact between solid particles within the vessel during operation of the mill. It is believed that such an apparatus may give some of the advantages of a vibratory mill in addition to those of the previously used sand mills.

The angle formed between the plane of the impeller and the longitudinal axis of the impeller shaft will depend to some extent upon the relative dimensions of the impeller and the internal volume of the vessel but an angle in the range 70° to 89½°, for example one in the range 83° to 89° and particularly one in the range 86° to 89° has been found to be very effective.

Any method may be adopted to fix the impeller to the impeller shaft at the desired angle which is sufficiently strong to support the mechanical stresses involved when the mill is in operation, for example the impeller may be bored centrally between the faces at the desired angle to take the impeller shaft and two supporting discs, bored at right angles to one face but having an inclined face to support the impeller, may then be placed on either side of the impeller. One of the supporting discs may be keyed or otherwise rigidly fixed to the impeller shaft and the other disc is then bolted through the impeller into the other disc thus forming a rigid assembly.

Alternatively, the centre portion of the impeller may be flat and have a central hole for the shaft between the faces and at right angles to the faces. Outside the flat central portion, the plane of the impeller may be formed at an angle to the impeller shaft other than a right angle.

After the slurry of milled solid, liquid and milling medium (if present) is withdrawn from the mill the milling medium can be separated from the slurry by any suitable means, for example by settling, sieving or by the use of a centrifuge and the milled solid may then be recovered, for example by filtration or by the use of a centrifuge or a hydroclone. The milled solid, may if desired, be subjected to additional treatments, for example to coating and/or fluid energy milling in the case of pigmentary titanium dioxide. Alternatively, the slurry may be passed through one or more mills of similar type to those described in the present specification before recovery.

It may be advantageous, when passing the particulate solid to be milled through a number of mills of the type described to adjust the concentration of the solid by the introduction of a diluting liquid, for example water, between the mills. Alternatively or additionally, chemicals, for example in the liquid form, may be added to the slurry between mills, for example dispersing or flocculating agents. Cooling may also be applied to the slurry passing between the mills, if desired, and this may be particularly useful if the heat loss from the mill is inhibited, for example by the presence of a coating of polyurethane rubber within the mill casing.

When milling titanium dioxide it has been found very convenient to supply this to the mill in the form of a slurry containing between about 250 and 2000 g./litre and particularly a slurry containing between about 600 to 1200 g./litre of $TiO_2$. The slurry preferably also contains a dispersing agent or agents, for example an inorganic compound such as an alkali metal silicate, phosphate or hydroxide or an organic compound, for example an amine, particularly an alkanolamine, such as ethanolamine or a propanolamine such as monoisopropanolamine. A mixture of sodium silicate and monoisopropanolamine has been found particularly effective.

The dispersing agent, when used, is preferably present in a concentration in the range between about 0.05 and 2.5%, particularly in the range 0.2% to 1.5% by weight on the material to be ground.

The amount of milling medium (where used) which is added before passing the mixture into the mill is conveniently in the range of 0.5 to 3 times, and preferably in the range 0.75 to 1.5 times, that of the volume of the slurry of liquid and particulate solid to be milled to which it is added.

When titanium dioxide is being milled which has been produced by the "sulphate" process the material, after discharge from the calciner, is preferably leached, for example with water or dilute mineral acid (to remove soluble materials) before being milled by the process of the present invention.

The mills of the present invention are normally fed with slurry under a positive pressure and preferably at a substantially constant rate, for example by means of a pump.

The retention time in the mill of the solids to be milled will depend upon the feed rate of the slurry to the mill and upon the dimensions of the mill, particularly upon the volume between the impeller and the containing vessel. Retention times in the range 10 to 50 seconds and particularly in the range 20 to 40 have been found very convenient when milling titanium dioxide pigment.

The mills of the present invention have a number of advantages compared with previously used mills. For example, they may be used satisfactorily with milling medium of a wider range of particle size for example between about 25 microns to 3000, particularly between about 75 to 1000 microns since changes in the rheology of the contents do not affect the milling efficiencies to the same extent as in other sand mills; they have a relatively low power consumption; the shorter residence time of the material to be milled in the mill reduces the rate of temperature increase and therefore the problem of cooling. Furthermore, the mills are relatively small and cheap to manufacture and, if desired, the material to be milled can be passed through a number of such mills in succession before recovering the milled solid. (In such cases cooling and/or dilution of the slurry can take place between the mills if this is found desirable.)

The attached drawing shows the end view of a mill according to the present invention.

In the drawing there is shown a vessel 1 having side walls 2 and 3 and peripheral wall 4. In side wall 2 there is a gland 5 through which passes impeller shaft 6 into the interior of the vessel. Side wall 2 is also perforated by an inlet port 7 and side wall 3 is perforated by exit port 8. The impeller shaft is rigidly fixed to the first impeller supporting disc 9 against the interior face of which is placed the impeller 10. The second impeller supporting disc 11 is placed on the end of the impeller shaft with its inclined face against the face of the impeller and six bolts 12 pass through disc 11, impeller 10 and into disc 9 thus forming a rigid assembly fixed to, and rotating with, the impeller shaft. The angle between the plane of the impeller and the longitudinal axis of the impeller shaft is that between the lines AA' and BB'.

Holes 13 are provided between the faces of the impeller.

*Example*

A mill was set up of the type described above but having no holes between the faces of the impeller wherein the impeller (which was a disc of polyurethane rubber) had a diameter of 12" and a thickness of ¾". The interior of the vessel was 12¾" in diameter and 1½" side (between the side walls). The smaller angle between lines AA' and BB' was 88°. The minimum clearance between the impeller and side wall was 17/64" and the maximum 31/64". The disc was rotated at various speeds between 820 and 1900 r.p.m. and a slurry containing 1% sodium silicate (by weight on TiO₂) as dispersing agent, rutile calciner discharge TiO₂ from a normal sulphate process (660 g./litre) and 1680 g./litre zircon sand (particle size 85 microns to 150 microns) was fed to the mill at feed rates between about 1.37 and 5.93 litres/minute.

The process described above was also carried out using an impeller (at an angle of 88° to the shaft) having a serrated periphery and six ½" diameter holes evenly spaced on a circle of 4⅜" radius from the centre of the impeller and formed at an angle of 45° to the faces of the impeller.

The *increases* in tinting strength (on the Reynold's Blue Scale) obtained are given in the attached table for the plain and holed discs where they are compared with results obtained under similar conditions with mills having:

(a) A plain impeller (i.e. without holes) in which the plane of the impeller was substantially at right angles to the longitudinal axis of the impeller shaft, and (b) An impeller similar to (a) above but having 6 holes ½" diameter formed at 45° to the faces of the impellers on a circle of 4⅜" radius from the centre of the impeller.

Mills (a) and (b) are not, of course, according to the present invention.

The calciner discharge material, before milling, had a tinting strength of 1500.

TABLE

| Feed Rate, l./min. | Disc Speed, r.p.m. | Gain in Tinting Strength | | | |
|---|---|---|---|---|---|
| | | (a) Plain Disc (at right angles to shaft) | (b) Holed Disc (at right angles to shaft) | Plain Disc (at 88° to the shaft) | Holed and Serrated Disc (at 88° to the shaft) |
| 1.37 | 820 | 110 | 180 | 260 | 280 |
| 1.38 | 1,900 | 140 | 240 | 310 | 330 |
| 1.53 | 1,900 | 140 | 230 | 310 | 330 |
| 2.03 | 1,230 | 110 | 180 | 260 | 290 |
| 4.56 | 1,900 | 100 | 160 | 220 | 250 |
| 5.38 | 1,900 | 90 | 140 | 200 | 230 |
| 5.93 | 820 | 50 | 90 | 110 | 140 |

What is claimed is:

1. In a process for milling particulate solids in liquids in which there is provided a milling zone having in operable association therewith a rotatable generally disc-shaped impeller within said milling zone, and first and second fluid directing means, each of which is adapted for directing the flow of fluid between the inside and outside of said milling zone, the improvement comprising rotating said rotatable generally disc-shaped impeller with a peripheral speed in the range of about 10 to 120 feet per second while maintaining the plane of said impeller at an angle other than a right angle with the axis of rotation, feeding through one of said fluid directing means into said milling zone a slurry containing particulate solids to be milled at a concentration in the range of 250 to 2,000 grams per liter of slurry, maintaining said slurry in said milling zone for a period corresponding to a retention time of 10 to 50 seconds per pass and withdrawing said slurry from said milling zone through the other of said fluid directing means.

2. A process as claimed in claim 1 wherein there is also present in the vessel a particulate milling medium.

3. A process as claimed in claim 2 wherein the particulate grinding medium has a particle size in the range 75 to 1000 microns.

4. A process as claimed in claim 1 wherein the peripheral speed of the impeller is in the range 20 to 105 ft./sec.

5. A process as claimed in claim 1 wherein the particulate solid to be milled consists of millable particles of titanium dioxide.

References Cited

UNITED STATES PATENTS

| 859,863 | 7/1907 | Young | 241—30 |
| 1,643,387 | 9/1927 | Cawood | 241—191 |
| 1,660,242 | 2/1928 | Thomson | 241—30 |
| 1,781,435 | 11/1930 | Carper | 241—26 |
| 2,115,997 | 5/1938 | Morse | 241—30 |
| 2,589,917 | 3/1952 | Zuckert | 241—157 |
| 3,005,597 | 10/1961 | Neidl | 241—255 |

FOREIGN PATENTS 654,426  6/1951  Great Britain.

JAMES M. MEISTER, *Primary Examiner.*

U.S. Cl. X.R.

241—188, 255, 254